United States Patent
Aoki et al.

(10) Patent No.: US 6,757,749 B2
(45) Date of Patent: Jun. 29, 2004

(54) DATA-OUTPUT-CONTROL APPARATUS AND DATA-OUTPUT-SERVICE PROVIDING METHOD

(75) Inventors: Mikio Aoki, Suwa (JP); Shinya Taniguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 318 days.

(21) Appl. No.: 09/892,885

(22) Filed: Jun. 28, 2001

(65) Prior Publication Data

US 2002/0013870 A1 Jan. 31, 2002

Related U.S. Application Data

(63) Continuation of application No. PCT/JP00/07715, filed on Nov. 1, 2000.

(30) Foreign Application Priority Data

Nov. 1, 1999 (JP) .......................................... H11-311597

(51) Int. Cl.[7] .............................................. G06F 3/00
(52) U.S. Cl. .............................. 710/5; 710/36; 710/105; 712/225; 709/226
(58) Field of Search ............................. 710/1, 7, 15, 5, 710/18, 36, 52, 105, 107; 712/225; 709/223, 226, 231, 238

(56) References Cited

U.S. PATENT DOCUMENTS

| 5,067,123 A | * | 11/1991 | Hyodo et al. ............... 370/58.1 |
| 5,668,948 A | * | 9/1997 | Belknap et al. ............... 709/231 |
| 6,061,149 A | * | 5/2000 | Hosokawa et al. .......... 358/442 |
| 6,195,703 B1 | * | 2/2001 | Blumenau et al. ........... 709/238 |
| 6,208,644 B1 | * | 3/2001 | Pannell et al. ............... 370/389 |
| 6,334,126 B1 | * | 12/2001 | Nagatomo et al. ............. 707/4 |

FOREIGN PATENT DOCUMENTS

| EP | 0 930 757 A | 7/1999 |
| JP | A-8-166915 | 6/1996 |
| JP | A-10-191453 | 7/1998 |
| JP | A-10-222527 | 8/1998 |
| JP | A-10-333845 | 12/1998 |
| JP | A-11-7365 | 1/1999 |
| JP | A-11-66051 | 3/1999 |
| JP | A-11-126189 | 5/1999 |
| JP | A-11-136394 | 5/1999 |
| JP | A-11-154218 | 6/1999 |
| JP | A-11-191081 | 7/1999 |
| WO | WO 98 47295 A | 10/1998 |
| WO | WO 99 00968 A | 1/1999 |

OTHER PUBLICATIONS

European Search Report for corresponding Application EP 00 97 1736, dated May 2003.

* cited by examiner

*Primary Examiner*—Jeffrey Gaffin
*Assistant Examiner*—Rijue Mai
(74) *Attorney, Agent, or Firm*—Oliff & Berridge, PLC

(57) ABSTRACT

A data-output-control apparatus is provided which can easily acquire detailed information on a network and which, for outputting the detailed information, does not require a portable terminal to increase memory and is suitable to reduce a processing load on the portable terminal. A data-output-control terminal links by the Internet so as to communicate with a portable terminal carried by a user, printers located in areas, and WWW servers, and performs, when receiving a data-printing request from the portable terminal, acquiring data according to the data-printing request from the WWW server, selecting any one of a plurality of printers, and outputting the acquired data to the selected printer.

18 Claims, 6 Drawing Sheets

DATA-OUTPUT-CONTROL APPARATUS AND DATA-OUTPUT-SERVICE PROVIDING METHOD

BACKGROUND OF THE INVENTION

1. Field of the Invention

The present invention relates to apparatus and methods in which a portable terminal carried by a user, and a plurality of printers located in various areas, are linked by a network so as to communicate with one another, and data according to a data-printing request is output to any one of the printers when the data-printing request is received from the portable terminal. In particular, the invention relates to a data-output-control apparatus and a data-output-service providing method which enable detailed information on a network to be easily obtained, and which are suitable for eliminating the need for increasing the memory of a portable terminal and for reducing a processing load on the portable terminal.

2. Description of the Related Art

Recently, information on the Internet can be easily obtained anywhere by using, for example, the i-mode (registered trademark) provided by NTT Mobile Communications Network, Inc. (NTT DoCoMo).

Although a portable terminal of the above type can easily obtain information on the Internet anywhere, displayed information is greatly simplified compared with that displayed by an ordinary personal computer, since a display has a simplified structure for the purpose of size reduction and power saving of the portable terminal, so that a use is not satisfied with the displayed information.

Accordingly, in order to obtain detailed information while maintaining size reduction and power saving of the portable terminal, a structure can be provided which combines a portable terminal and a printer, wherein outline information is displayed by the portable terminal and detailed information is displayed by the printer. However, in combining the portable terminal and the printer, there are some problems that must be technically solved.

For example, it is difficult to carry the printer together with the portable terminal since the printer is large in size. Accordingly, to print the detailed information, it is possible that printers installed in homes and offices be ordinarily used. Nevertheless, in a case in which a particular fixed printer is used, information cannot be easily obtained anywhere. To realize this, it is necessary to reduce the size of the printer so as to be carried, or to enable the use of an arbitrary printer. It is extremely difficult to technically achieve the former case with presently available technology, and the former case is not realistic. In the latter case, each printer needs its own driver, and drivers for all printers to be used must be installed in the portable terminal, so that the latter case is also not realistic.

In addition, in the case of displaying detailed information by a printer, it is possible that a portable terminal reads print data to be printed, and converts the read print data into data printable by the printer before outputting the read print data. In this case, the print data and the data printable by the printer require relatively large capacity, so that memory having sufficient capacity for reading and generating the data must be provided in the portable terminal. Also, conversion into the data printable by the printer relatively causes a processing load, so that the portable terminal must be provided with a processor having a sufficient function of converting data within an effective time. Both cases not only require costs but also make it difficult to achieve size reduction and power saving of the portable terminal.

SUMMARY OF THE INVENTION

Accordingly, the present invention overcomes the above problems with the conventional technology, and an object thereof is to provide a data-output-control apparatus and a data-output-service providing method which enable detailed information on a network to be easily obtained, and which are suitable for eliminating the need for increasing the memory of a portable terminal and for reducing a processing load on the portable terminal.

To achieve the foregoing object, a data-output-control apparatus in accordance with the present invention is a data-output-control apparatus for linking, so as to communicate with, a communication terminal, which transmits a data-output request, and an output terminal, which outputs data. The data-output-control apparatus receives the data-output request from the communication terminal and outputs data according to the data-output request to the output terminal. The data-output-control apparatus further links so as to communicate with a data-storage terminal to store data, and the data according to the data-output request is acquired from the data-storage terminal and the acquired data is output to the output terminal.

In this structure, when a data-printing request is received from a communication terminal, data according to the data-output request is acquired from a data-storage terminal, and the acquired data is output to an output terminal. Next, the data is output by the output terminal.

Here, the output terminal may have any structure if it can output data, and includes, for example, a display that displays data, a sound-output device that outputs data as sound, etc., and a printer that prints data. This applies to a data-output-control apparatus as set forth above and below.

Also, the communication terminal may have any structure if it has at least a function of communicating with the apparatus, and includes, for example, a portable terminal which can be carried, such as a portable telephone, a personal computer, or a telephone. This applies to a data-output-control apparatus as set forth above and below.

A data-output-control apparatus in accordance with another aspect of the present invention is data-output-control apparatus for linking, so as to communicate with, a communication terminal, which transmits a data-output request, and a plurality of output terminals, which output data. The data-output-control apparatus receives the data-output request from the communication terminal and outputs data according to the data-output request to the output terminals. From among the plurality of output terminals, any one is selected, and the data according to the data-output request is output to the selected output terminal.

In this structure, when a data-printing request is received, any one of a plurality of output terminals is selected, and data according to the data-output request is output to the selected output terminal. The data is output by the output terminal.

Here, to select an output terminal, from among a plurality of output terminals, for example, an output terminal designated by a portable terminal may be selected, and an output terminal which is considered closest in distance or time when the position of the portable terminal is used as a reference may be selected.

Also, the data according to the data-printing request may be obtained by receiving it from, for example, a communication terminal, and may be acquired from a place other than the apparatus and the communication terminal. In the latter case, more specifically, the following structure is provided. That is, it includes an acquiring device which links by a network so as to communicate with a data-storage terminal that stores data and which acquires data according to the data-printing request, and outputs the data acquired by the acquiring device to a selected output terminal.

In this structure, when a data-printing request is received from a communication terminal, data according to the data-printing request is acquired from an acquiring device, and the acquired data is output to a selected output terminal.

According to the data-output-control apparatus in accordance with the present invention, concerning outputting detailed information on a network, processing on the output of data is performed in a place other than a communication terminal. Thus, increase of memory in the communication terminal is unnecessary, and a processing load on the communication terminal is reduced. Since it is not necessary to load data into the communication terminal, communication time is reduced, and the time required to receive provision of output data decreases. Therefore, an advantage is obtained in that a service provider can provide a user with an output service establishing a comfortable output environment irrespective of the function of the communication terminal.

According to the data-output-control apparatus in accordance with another aspect of the present invention, compared with a conventional case, detailed information on a network can be easily obtained. Therefore, an advantage is obtained in that a service provider can provide a user with an information service from which a feeling of great satisfaction is obtained.

According to the data-output-control apparatuses in accordance with other aspects of the invention, compared with a conventional case, detailed information on a network can be easily obtained, and when detailed information is printed, processing on the output of data is performed in a place other than a communication terminal, so that increase of memory in the communication terminal is unnecessary, and a processing load on the communication terminal is reduced. Also, since it is not necessary to load data into the communication terminal, communication time is reduced, and the time required to receive provision of output data decreases. Therefore, an advantage is obtained in that to a user, a service provider can provide an information service from which a feeling of great satisfaction is obtained and can provide an output service establishing a comfortable output environment irrespective of the function of the communication terminal.

According to the data-output-control apparatus in accordance with another aspect of the present invention, a user is allowed to easily receive provision of output data, so that the user can easily obtain detailed information on a network. Therefore, an advantage is obtained in that a service provider can provide a user with an information service from which a feeling of much great satisfaction is obtained.

According to the data-output-control apparatus in accordance with another aspect of the present invention, detailed information in all data-storage terminals linked to a network can be obtained. Therefore, an advantage is obtained in that a service provider can provide a user with an information service from which a feeling of much great satisfaction is obtained.

According to the data-output-control apparatus in accordance with another aspect of the present invention, a portable terminal displays outline information and an output terminal prints detailed information, so that a portable terminal can obtain detailed information on a network and comfortable processing is realized. Therefore, an advantage is obtained in that to a user, a service provider can provide an information service from which a feeling of much great satisfaction is obtained and can provide a printing service establishing a much comfortable printing environment.

According to the data-output-control apparatus in accordance with another aspect of the present invention, printing by a user of wrong data can be prevented. Therefore, an advantage is also obtained in that a service provider can provide a user with an information service from which a feeling of much great satisfaction is obtained.

According to the data-output-control apparatus in accordance with another aspect of the present invention, a service charge, as a cost for provision of a printing service, can be clearly calculated, and it is not necessary to fully calculate a service charge whenever a printing service is provided. Therefore, an advantage is also obtained in that a service provider has a facilitated business procedure for settlement of the service charge and can provide an information service from which a feeling of much great satisfaction is obtained since a clear service charge can be shown to a user.

According to the data-output-control apparatus in accordance with another aspect of the present invention, if a new output terminal is provided, a service provider side simply needs to change only the setting of the new output terminal, and the new output terminal can be used without changing any setting by the service provider side. Therefore, an advantage is obtained in that the service provider side has a facilitated operation concerning additional provision of an output terminal, and can provide a user with an information from which a feeling of much great satisfaction is obtained.

According to the data-output-control apparatus in accordance with another aspect of the present invention, a user can go, in accordance with guidance information, to an installation place where an output terminal is installed. Therefore, an advantage is obtained in that a service provider can provide a user with an information service from which a feeling of much great satisfaction is obtained.

In addition, according to the data-output-service providing method of the present invention, detailed information on a network can be easily obtained, and when detailed information is printed, processing on the output of data is performed in a place other than a communication terminal, so that increase of memory in the communication terminal is unnecessary, and a processing load on the communication terminal is reduced. Also, since it is not necessary to load data into the communication terminal, communication time is reduced, and the time required to receive provision of output data decreases. Therefore, an advantage is obtained in that to a user, a service provider can provide an information service from which a feeling of great satisfaction is obtained and can provide an output service establishing a comfortable output environment irrespective of the function of the communication terminal.

According to the data-output-service providing method in accordance with the present invention, a user is allowed to easily receive provision of output data, so that the user can easily obtain detailed information on a network. Therefore, an advantage is obtained in that a service provider can provide a user with an information service from which a feeling of much great satisfaction is obtained.

DETAILED DESCRIPTION OF THE PREFERRED EMBODIMENTS

Figure 1:
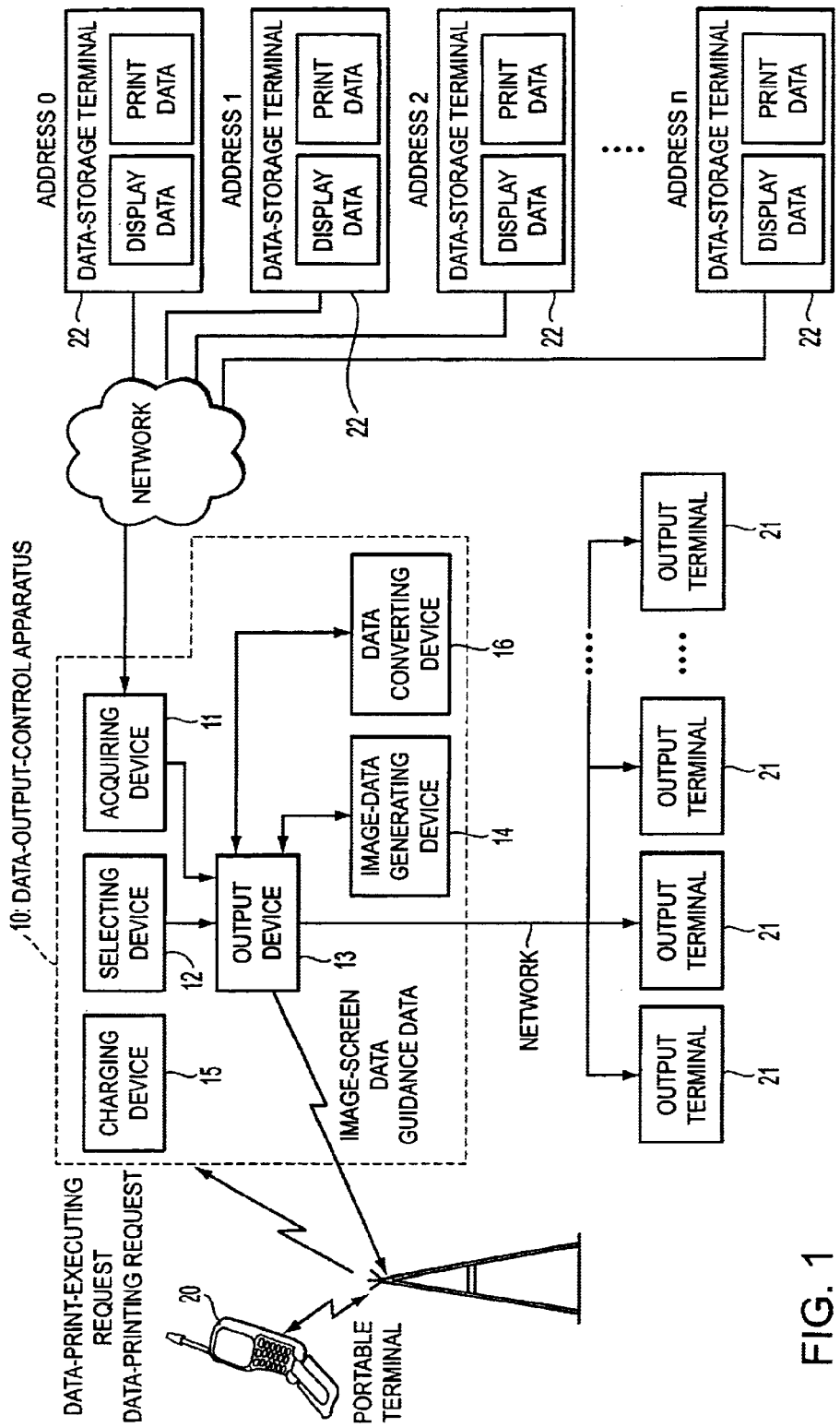
FIG. 1 is a schematic showing the concepts of the structures of data-output-control apparatus of the present invention.

Data-output-control apparatuses in accordance with the present invention are described with reference to FIG. 1. FIG. 1 is a schematic showing the data-output-control apparatuses of the invention.

A data-output-control apparatus 10 of the present invention is, as shown in FIG. 1, a data-output-control apparatus that links, by a network, so as to communicate with a portable terminal 20, carried by a user which transmits a data-printing request, and a plurality of output terminals 21 located in areas which print data. The data-output-control apparatus receives the data-output request from the portable terminal 20 and outputs the data according to the data-printing request to the output terminals 21. The data-output-control apparatus further links so as to communicate with each data-storage terminal 22 to store data by a network. The data-output-control apparatus includes: an acquiring device 11 that acquires, from the data-storage terminal 22, the data according to the data-printing request as a request to print the data stored in the data-storage terminal 22; a selecting device 12 that selects any one from among the plurality of output terminals 21; and an output device 13 that outputs the data acquired by the acquiring device 11 to the selected output terminal 21.

In this structure, when a data-printing request which is a request to print data stored in the data-storage terminal 22 is received from the portable terminal 20, data according to the data-printing request is acquired from the data-storage terminal 22 by the acquiring device 11, any one of the plurality of output terminals 21 is selected by the selecting device 12, and the acquired data is output to the selected output terminal 21 by the output device 13. Subsequently, the data is printed by the output terminal 21.

Here, the selecting device 12 may have any structure if it can select any one of the plurality of output terminals 21. For example, one output terminal 21 designated by the portable terminal 20 may be selected.

Also, any of the portable terminal 20, the output terminals 21, and the data-storage terminals 22 may link by a single network so as to communicate with one another, and may link by different networks so as to communicate with one another. In the example in FIG. 1, they link by different networks so as to communicate with one another.

In addition, a data-output-control apparatus 10 in accordance with another aspect of the present invention is provided, as shown in FIG. 1, such that, in the data-output-control apparatus 10, the selecting device 12 may select, from among the plurality of output terminals 21, an output terminal 21 which is considered optimal for the user of the portable terminal 20 to receive provision of the output data.

In this structure, by using the selecting device 12 selects, from among the plurality of output terminals 21, an output terminal 21 which is considered optimal for the user of the portable terminal 20 to receive provision of the output data.

Here, the output terminal 21 which is considered optimal for the user of the portable terminal 20 to receive provision of the output data includes, for example, an output terminal 21 that is considered closest in distance or time with respect to the position of the portable terminal 20, an output terminal 21 that is considered closest in distance or time with respect to a destination of the user of the portable terminal 20, an output terminal 21 that is considered to enable the user to receive provision of the output data most quickly when a data-output speed of the output terminal 21 is considered, and an output terminal 21 having a smallest cost for provision of the output data.

More specifically, the following structure is provided. That is, as shown in FIG. 1, the data-output-control apparatus 10, based on portable-terminal-position data that specifies the position of the portable terminal 20, the selecting device 12 may select any one of the plurality of output terminals 21.

In this structure, by using the selecting device 12, based on the portable-terminal-position data, any of the plurality of output terminals 21 is selected.

Here, the portable-terminal-position data may be obtained by using the apparatus 10 to determine the position of the portable terminal 20, may be obtained from the portable terminal 20 by using the GPS or the like to determine the position of the portable terminal 20, and may be obtained by determining the position of the portable terminal 20 by a base station with which the portable terminal 20 links.

In addition, a data-output-control apparatus 10 in accordance with another aspect of the present invention is provided, as shown in FIG. 1, such that in the data-output-control apparatus 10, the data-printing request may include an address uniquely specifying the position on the network of the data-storage terminal 22, and the acquiring device 11 may acquire data from one data-storage terminal 22 specified by the address included in the data-printing request.

In this structure, when the data-printing request is received from the portable terminal 20, the acquiring device 11 acquires data from the data-storage terminal 22 specified by the address included in the data-printing request.

Here, more specifically, the following structure is provided. That is, as shown in FIG. 1, in the data-output-control apparatus 10, the network with which the data-storage terminal 22 links is the Internet, the data-printing request includes a URL (Universal Resource Locater) that uniquely specifies the position of a terminal linking with the Internet, and the acquiring device 11 acquires data from the data-storage terminal 22 specified by the URL included in the data-printing request.

In this structure, when the data-printing request is received from the portable terminal 20, the acquiring device 11 acquires data via the Internet from the data-storage terminal 22 specified by a URL included in the data-printing request.

A data-output-control apparatus 10 in accordance with another aspect of the present invention is provided, as shown in FIG. 1, such that in the data-output-control apparatus 10, the data-storage terminal 22 stores display data that displays by the portable terminal 20 and print data that prints by one output terminal 21 corresponding to the display data, and the acquiring device 11 acquires, as the data according to the data-printing request, the print data from the data-storage terminal 22.

In this structure, when the data-printing request is received from the portable terminal 20, the acquiring device 11 acquires, as the data according to the data-printing request, the print data from the data-storage terminal 22. In the portable terminal 20, the display data is loaded and displayed when accessing the data-storage terminal 22.

A data-output-control apparatus 10 in accordance with another aspect of the present invention is provided, as shown in FIG. 1, such that in the data-output-control apparatus 10, there is provided an image-data generating device 14 that generates image-screen data which is displayable by the portable terminal 20 and which corresponds to an image screen obtained when based on the data acquired by the acquiring device 11, the data is printed by the output terminal 21, and the output device 13 may output, to the portable terminal 20, the image-screen data generated by the image-data generating device 14, and may output the data acquired by the acquiring device 11 to the output terminal 21 selected by the selecting device 12 when receiving, as a response to the output of the image-screen data, a data-print-executing request from the portable terminal 20.

In this structure, based on the data acquired by the acquiring device 11, the image-data generating device 14 generates, the image-screen data which is displayable by the portable terminal 20 and which corresponds to an image screen obtained when the data is printed by the output terminal 21. The output device 13 outputs, to the portable terminal 20, the image-screen data generated by the image-data generating device 14, and outputs the data acquired by the acquiring device 11 to the output terminal 21 selected by the selecting device 12 when receiving, as a response to the output of the image-screen data, the data-print-executing request from the portable terminal 20.

A data-output-control apparatus 10 in accordance with another aspect of the present invention is provided, as shown in FIG. 1, such that in the data-output-control apparatus 10, there is provided a charging device 15 that performs charging in accordance with the result of the use by the portable terminal 20 of a printing service provided by the apparatus 10.

In this structure, the charging device 15 performs charging in accordance with the result of the use by the portable terminal 20 of the printing service provided by the apparatus 10.

Here, the result of the use by the portable terminal 20 of the printing service provided by the apparatus 10 includes, for example, the capacity of the acquired print data, the number of sheets printed by the output terminal 21, and print specifications of the output terminal 21.

A data-output-control apparatus 10 in accordance with another aspect of the present invention is provided, as shown in FIG. 1, such that in the data-output-control apparatus 10, there is provided a data-converting device 16 that converts the data acquired by the acquiring device 11 into data printable by the output terminal 21, and the output device 13 may output the data obtained through the conversion by the data-converting device 16 to the output terminal 21 selected by the selecting device 12.

In this structure, the data-converting device 16 converts the data acquired by the acquiring device 11 into data printable by the output terminal 21, and the output device 13 outputs the data obtained through the conversion by the data-converting device 16 to the output terminal 21 selected by the selecting device 12.

A data-output-control apparatus 10 in accordance with another aspect of the invention is provided, as shown in FIG. 1, such that in the data-output-control apparatus 10, the output device 13 may output, to the portable terminal 20, guidance data representing guidance information for guiding the user of the portable terminal 20 to an installation place where the output terminal 21 selected by the selecting device 12 is installed.

In this structure, the output device 13 outputs the data to the output terminal 21 and outputs the guidance data to the portable terminal 20.

Accordingly, the portable terminal 20 displays the guidance information based on the guidance data, so that in accordance with the guidance information, the user of the portable terminal 20 can go to the installation place where the output terminal 21 is installed.

In addition, to achieve the foregoing object, a data-output-service providing method of the present invention is a data-output-service providing method for providing a service in which by using a network system using a network to communicate with a plurality of output terminals located in areas which print data and a data-storage terminal for storing data, a service provider outputs, in response to a data-printing request from a user, data according to the data-printing request to the output terminals. For the user, the data-output-service providing method includes a transmitting step for transmitting the data-printing request as a request to print the data stored in the data-storage terminal; and for the service provider, the data-output-service providing method includes: an acquiring step for acquiring, from the data-storage terminal, the data according to the data-printing request from the user; a selecting step for selecting any one from among the plurality of output terminals; and an output step for outputting the data acquired in the acquiring step to the selected output terminal.

Here, the selecting step may be a method if it can select any one of a plurality of output terminals. For example, an output terminal designated by the user may be selected.

A data-output-service providing method of the present invention is such that in the data-output-service providing method, the selecting step selects, from among the plurality of output terminals, an output terminal which is considered optimal for the user of the portable terminal to receive provision of the output data.

Here, the output terminal, which is considered optimal for the user of the portable terminal to receive provision of the output data, includes, for example, an output terminal that is closest in distance or time with respect to the position of the user, an output terminal that is closest in distance or time with respect to a destination of the user, and an output terminal that is considered to enable the user to receive provision of the output data most quickly when a data-output speed of the output terminal is considered.

An embodiment of the present invention is described below with reference to the drawings. FIG. 2 to FIG. 6 are illustrations of an embodiment of a data-output-control apparatus according to the present invention.

Figure 2:
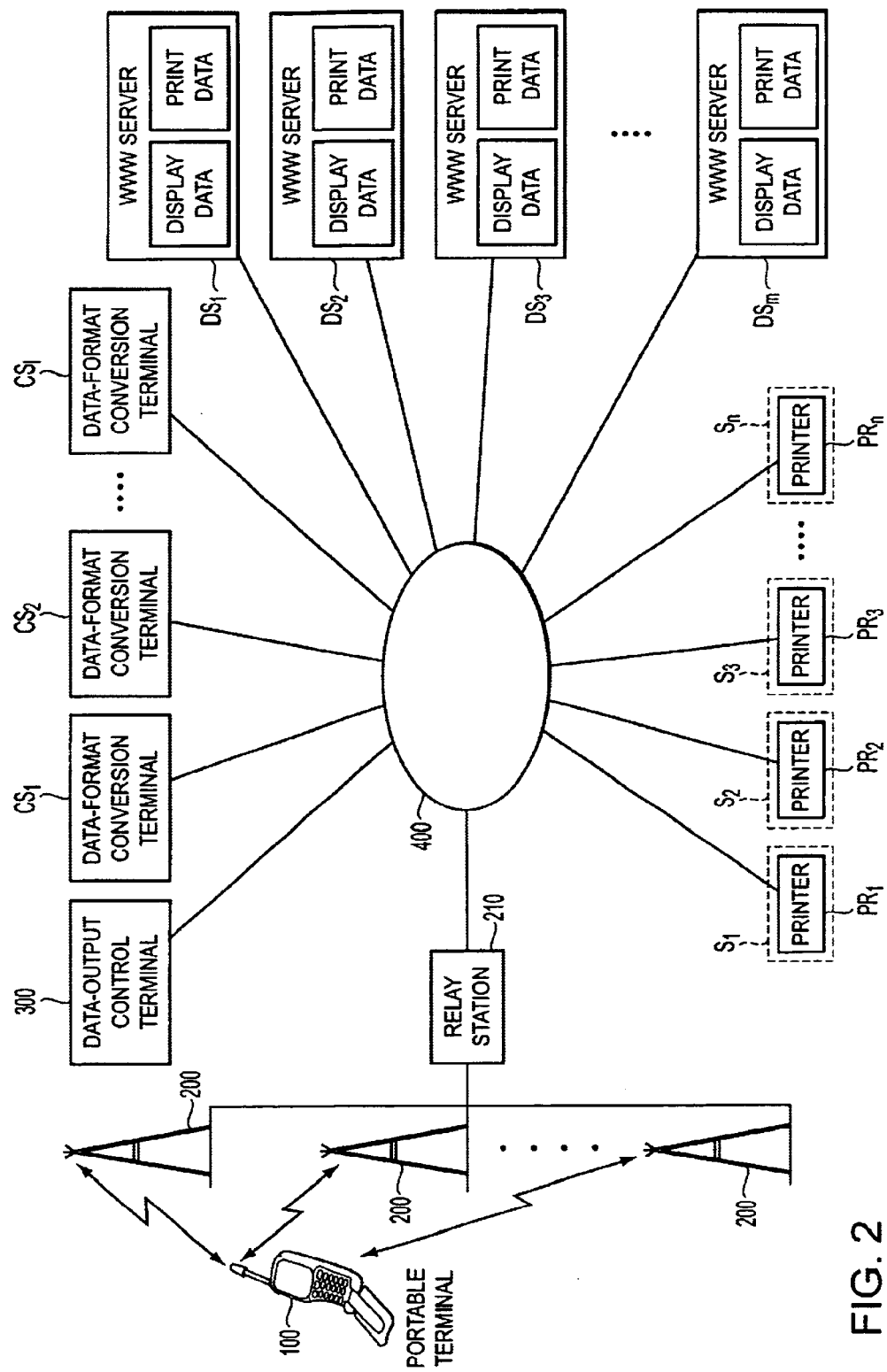
FIG. 2 is a structure showing a structure of a network system to which a data-output-control apparatus according to the present invention is applied.

In this embodiment, a data-output-control apparatus according to the present invention is applied to a service in which, as shown in FIG. 2, by using a data-output-control terminal 300 that is linked via the Internet 400 in a communicatable form to a portable terminal 100 carried by a user and printers $PR_1$ to $PR_n$ at a plurality of stores $S_1$ to $S_n$ in various places, a service provider acquires, in response to a data-printing request from a user, data in accordance with the data-printing request from any one of WWW (World Wide Web) servers $DS_1$ to $DS_m$ and outputs the data from any one of the printers $PR_1$ to $PR_n$. Although only one portable terminal 100 is shown for facilitating the understanding of the present invention, a plurality of portable terminals 100 of different types can be actually linked to the Internet 400.

At first, a structure of a network system to which the data-output-control apparatus according to the present invention is applied is described with reference to FIG. 2. FIG. 2 is a schematic showing the structure of the network system to which the data-output-control apparatus according to the present invention is applied.

As shown in FIG. 2, a relay station 210 that relays communication between the portable terminal 100 and the Internet 400, the printers $PR_1$ to $PR_n$ that print data, the WWW servers $DS_1$ to $DS_m$ that store data, the data-output-control terminal 300 that acquires, from any one of the WWW servers $DS_1$ to $DS_m$, data in accordance with a data-printing request, and outputs the data to any one of the printers $PR_1$ to $PR_n$, data-format-conversion terminals $CS_1$ to $CS_l$ that convert the data acquired by the data-output-control terminal 300 into data printable by the printers $PR_1$ to $PR_n$ are linked to the Internet 400.

A plurality of base stations 200 that perform radio communication with the portable terminal 100 are linked to the relay station 210. When the portable terminal 100 is linked to the Internet 400, the relay station 210 becomes a terminal on the Internet 400. The relay station 210 can use the Internet 400 to transmit, to an objective terminal, data received from the portable terminal 100 via the base stations 200, and can transmit, to the portable terminal 100, via the base stations 200, data supplied from an objective terminal on the Internet 400. The portable terminal 100 simultaneously communicates with at least three base stations 200. The relay station 210 measures each time difference from one and the others among the times required for radio waves from portable terminal 100 to reach the base stations 200, and determines the position of the portable terminal 100 based on the measured time differences.

The WWW servers $DS_1$ to $DS_m$ each includes a storage unit that stores display data to display by the portable terminal 100 and print data to print by the printers $PR_1$ to $PR_n$ in accordance with the display data, and a request-processing unit that transmits the data stored in the storage unit when requested by terminals linked to the Internet 400, such as the relay station 210 and the data-output-control terminal 300.

The request-processing unit operates such that, a CPU, which is not shown, executes a program stored in an external storage unit or the like, and can transmit the display data or the print data in the storage unit when receiving a data-transmission request from an external terminal (the portable terminal 100, the data-output-control terminal 300, etc.). A URL included in the data-transmission request determines whether either of the display data or the print data should be transmitted. The storage unit stores, as the print data, various files of text data, still picture data, sound data, data of moving picture such as MPEG, 3-D image data, such as VRML, and data of program such as JAVA, and an HTML (Hyper Text Markup Language) file.

Each of the data-format-conversion terminals $CS_1$ to $CS_l$ is a terminal that executes a data-format conversion process that converts data acquired by the data-output-control terminal 300 into data printable by the printers $PR_1$ to $PR_n$. In accordance with a transmission load on the Internet 400 or a processing load on the data-format-conversion terminal CS, from among the data-format-conversion terminals $CS_1$ to $CS_l$, one or more are selected, and the selected data-format-conversion terminals CS are used to execute the data-format conversion process. Specifically, in reverse order of processing loads on the Internet 400 or processing loads on the data-format-conversion terminals CS, from among the data-format-conversion terminals $CS_1$ to $CS_l$, one or more required for the data-format conversion process are selected.

Each data-format-conversion terminal CS that executes the data-format conversion process receives, from the data-output-control terminal 300, a data-format-conversion request and data to be converted. It uses the data-format conversion process to convert predetermined-format data among the data acquired by the data-output-control terminal 300 into data that can be printed by a corresponding one among the printers $PR_1$ to $PR_n$, and transmits the converted data to the data-output-control terminal 300.

For example, when the data-format-conversion terminals $CS_1$ to $CS_3$ executes the format conversion process, the data-format-conversion terminal $CS_1$ converts, among the data acquired by the data-output-control terminal 300, data having predetermined format A (e.g., HTML form) into data printable by the printers $PR_1$ to $PR_5$, the data-format-conversion terminal $CS_2$ converts, among the data acquired by the data-output-control terminal 300, data having predetermined format B (e.g., JPEG form) into data printable by the printers $PR_6$ to $PR_{10}$, and the data-format-conversion terminal $CS_3$ converts, among the data acquired by the data-output-control terminal 300, data having predetermined format C (e.g., WORD (registered trademark) document form) into data printable by the printers $PR_{11}$ to $PR_{15}$. In this case, superficially, the printers $PR_1$ to $PR_5$ are dedicated apparatuses that print the data having predetermined format A, the printers $PR_6$ to $PR_{10}$ are dedicated apparatuses for printing the data having predetermined format B, and the printers $PR_{11}$ to $PR_{15}$ are dedicated apparatuses for printing the data having predetermined format C.

In addition to the conversion of the data acquired by the data-output-control terminal 300, the data-format-conversion terminal Cc that executes the data-format conversion process generates preview data, which can be displayed by the portable terminal 100 in accordance with the display function (displayable lines, display resolution, etc.) of each type of the portable terminal 100, and which is an image formed when the printer PR prints the data acquired by the data-output-control terminal 300, and transmits the generated preview data to the data-output-control terminal 300.

Accordingly, the data-output-control terminal 300 transmits, to the data-format-conversion terminal CS corresponding to the printer PR which will print data in accordance with a data-printing request, a data-format-conversion request and data acquired form the WWW server DS, and receives, as a response, data printable by the printer PR which will perform printing and preview data.

Figure 3:
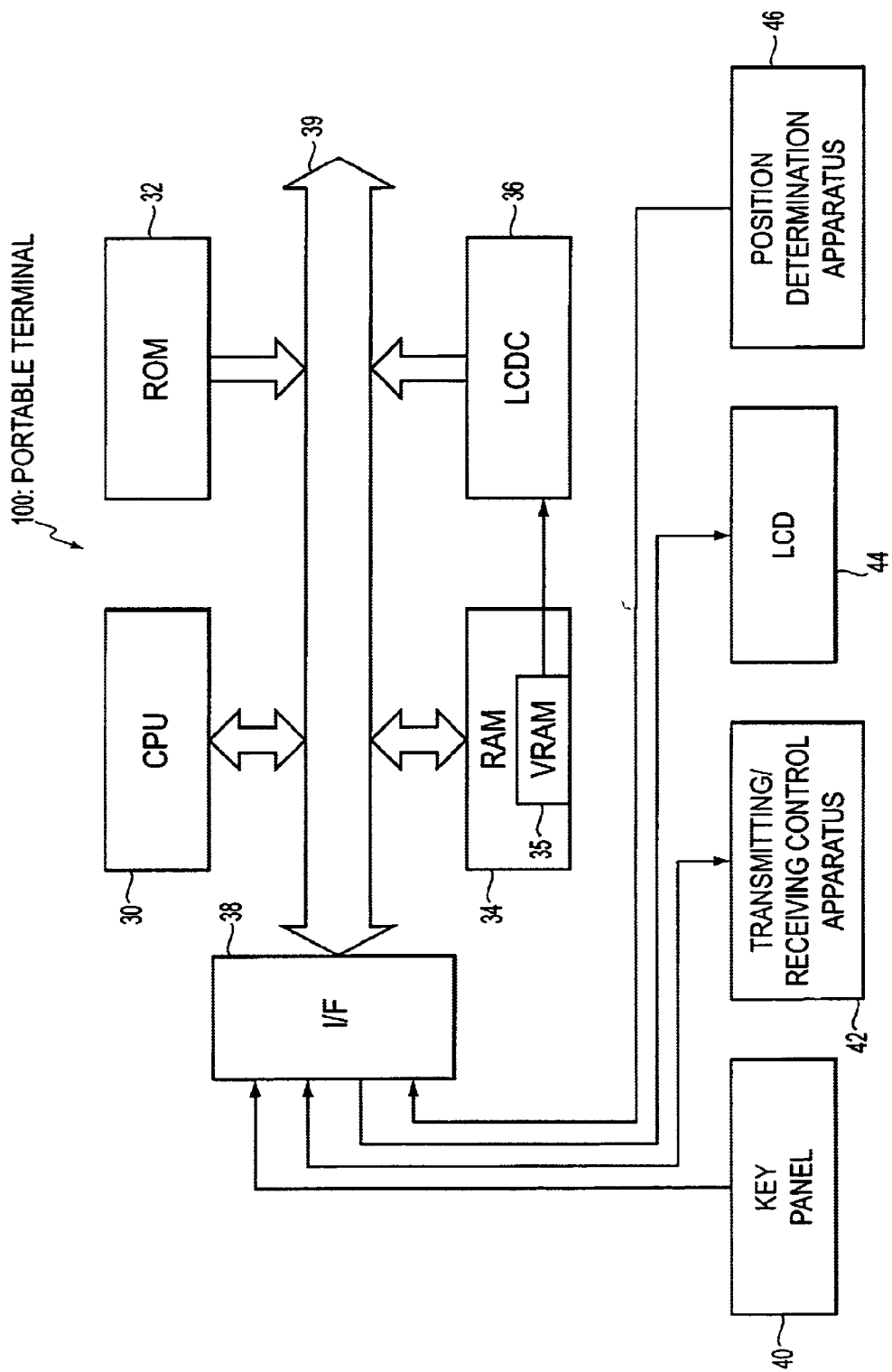
FIG. 3 is a schematic showing a portable terminal 100.

Next, the structure of the portable terminal 100 is described with reference to FIG. 3. FIG. 3 is a schematic showing the structure of the portable terminal 100.

The portable terminal 100 includes, as shown in FIG. 3, a CPU 30 that controls, based on a control program, operations and the entire system, a ROM 32 that stores the control program for the CPU 30, etc., in a predetermined region, a RAM 34 for storing data read from the ROM 32, etc., and operation results required for the process of operation by the CPU 30, an LCDC (Liquid Crystal Display Controller) 36 that converts data stored in a specific region of the RAM 34 into picture signals and outputs the signals to an LCD (Liquid Crystal Display) 44, and an I/F 38 that mediates the input/output of data with respect an external apparatus, and these devices are mutually connected by a bus 39 as a signal line that transfers data so that data can be exchanged.

A key panel 40, as a human interface, which can input data by using a plurality of keys, a transmitting/receiving control apparatus 42 that communicates with the base stations 200, an LCD 44 that displays a screen based on picture signals, and a position-determination apparatus 46 that determines the position of the present spot are connected as external apparatuses to the I/F 38.

The ROM 32 stores, not only the control program for the CPU 30, but also authentication data for authentication of whether or not a user is authorized to use a printing service provided by the data-output-control terminal 300.

The RAM 34 includes, as a specific region, a VRAM 35 that stores display data for display by the LCD 44, and the VRAM 35 can be separately accessed by the CPU 30 and the LCDC 36.

The LCDC 36 sequentially reads the display data stored in the VRAM 35 from a start address at a predetermined cycle, converts the read display data into a picture signal, and outputs the picture signal to the LCD 44.

The position-determination apparatus 46, which uses a GPS (Global Positioning System) or the like, receives time signals from orbital satellites that each transmit a time signal representing the present time, and determines the position of the present spot based on a difference in the present time which is represented by the time signals and the orbits of the orbital satellites.

Figure 4:
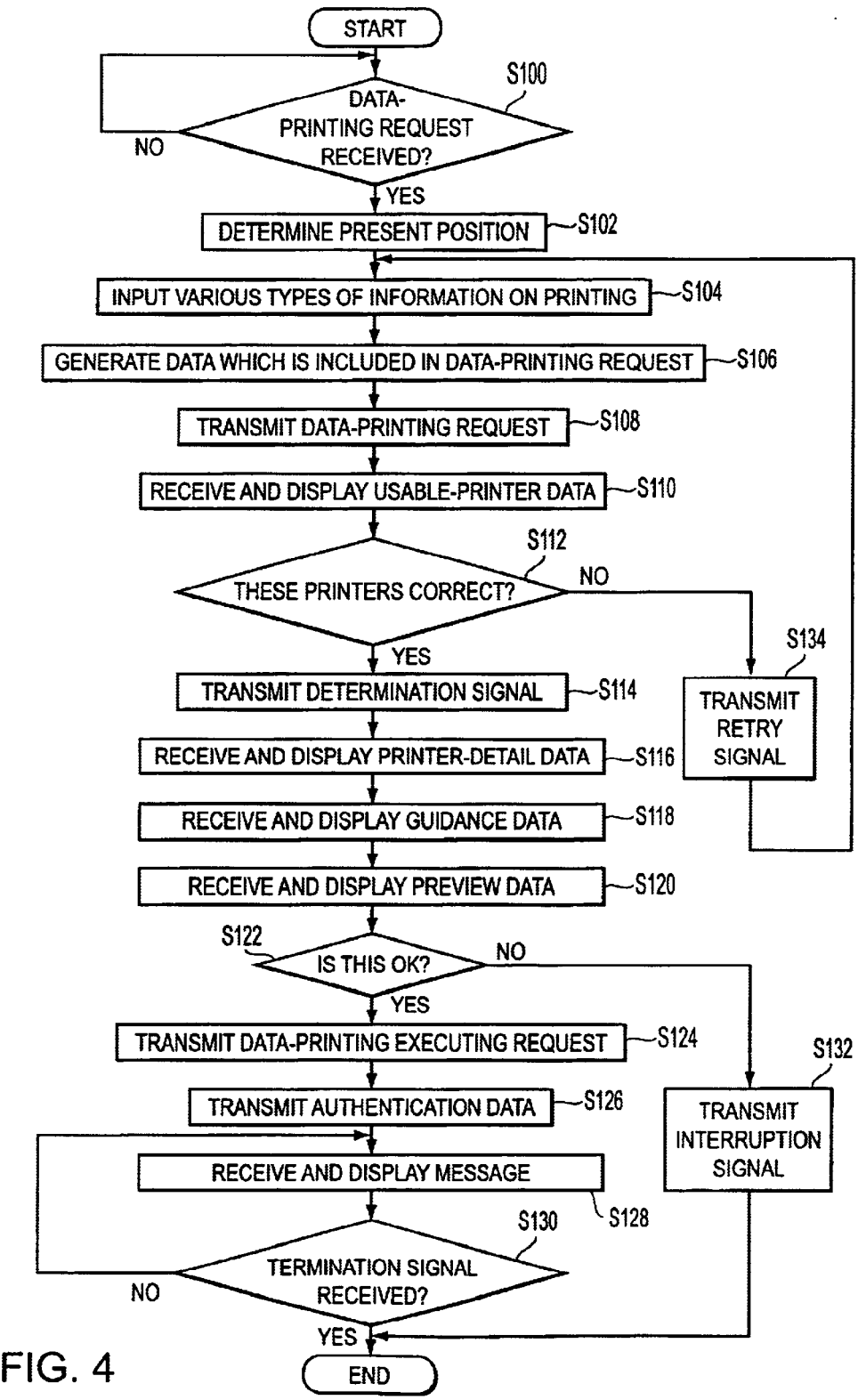
FIG. 4 is a flowchart showing a data-printing-request process.

The CPU 30 is made of a micro-processing unit MPU or the like, and activates a predetermined program stored in a predetermined region of the ROM 32 50 that the data-printing-request process shown in the flowchart of FIG. 4 can be executed in accordance with the program.

FIG. 4 is a flowchart showing a data-printing-request process. The data-printing-request process is a process in which, by issuing a data-printing request to the data-output-control terminal 300, it is requested to use any one of the printers $PR_1$ to $PR_n$ to print data of the WWW server DS designated by a user. When this process is executed by the CPU 30, the process proceeds to step S100, as shown in FIG. 4.

In step S100, the process determines whether or not the data-printing request is input by the user via the key panel 40. If the process has determined that the data-printing request has been input (Yes), the process proceeds to step S102 and determines the position of the present spot by using the position-determination apparatus 46, and proceeds to step S104 and allows various types of information about printing to be input from the key panel 40. The user inputs, as the various types of information, for example, a URL uniquely specifying the position of the WWW server DS on the Internet 400 which stores print data to be printed, a desired area as an approximate place in which the user wishes for the output data to be provided, printing specifications concerning the printer PR, such as sheet size, distinction between color and monochrome, printing precision, and printing speed, a data format of print data to be printed, and a printer ID for identifying a printer PR which is required when the printer PR is directly designated. All these input items are not essential items and are selectively input as required by the user. Concerning the URL of the WWW server DS, the URL of the WWW server DS that is being viewed by the user is automatically input.

Next, processing to step S106, the process generates, based on the input various types of information about printing, data that is included in the data-printing request. Specifically, the data that is included in the data-printing request is generated so that the position of the present spot determined in step S102 is used as portable-terminal-position data that specifies the position of the present spot. The URL of the WWW server DS is used as print-object-storage-position data representing the URL. When a desired area for provision is input, it is used as desired-area-for-provision data representing the desired area for provision. When printing specifications concerning the printer PR are input, they are used as printing-specification data. When a data format is input, it is used as print-format data representing the data format. When a printer ID for the printer PR is input, it is used as printer-identification data representing the printer ID.

Next, after processing to step S108, the process transmits the data-printing request to the data-output-control terminal 300, and proceeds to step S110, in which the process receives, from the data-output-control terminal 300, as a response, usable-printer data representing a list of some usable printers considered optimal for the user to be provided with output data, and displays, on the LCD 44, the list of the usable printers PR based on the received usable-printer data before proceeding to step S112.

In step S112, the process determines whether or not, among the usable printers PR displayed on the LCD 44, there is a desired printer for which the user wishes to provide the output data. When by inputting a selection from the key panel 40 among the usable printers PR displayed on the LCD 44, it is determined (Yes) that there is the desired printer PR for which the user wishes to provide the output data, the process proceeds to step S114.

In step S114, a determination signal representing the determination of the printer PR is transmitted to the data-output-control terminal 300, and the process proceeds to step S116, in which printer information that is detailed information (place where the printer PR is installed, print specifications, etc.) about the determined printer PR is received as a first response to the transmission of the determination signal, and the detailed information about the determined printer PR is displayed on the LCD 44, based on the received printer information. The process proceeds to step S118.

In step S118, guidance data that represents guidance information (route information, map information, etc.) that guides the user from the position of the portable terminal 100 to an installation place where the determined printer PR is installed is received as a second response to the transmission of the determination signal from the data-output-control terminal 300, and based on the received guidance data, the guidance information is displayed on the LCD 44. Proceeding to step S120, preview data is received as a third response to the transmission of the determination signal from the data-output-control terminal 300. Based on the received preview data, an image which is printed by the determined printer PR is displayed on the LCD 44, and process proceeds to step S122.

In step S122, it is determined whether or not the image displayed on the LCD 44 is identical to print data to be printed. When by using the key panel 40 to input selection indicating that the image displayed on the LCD 44 is identical, it is determined (Yes) that the image displayed on the LCD 44 is identical, the process proceeds to step S124. At this time, when the preview data consists of a plurality of data, a desired portion to be printed among the data can be particularly designated.

In step S124, a data-print-executing request is transmitted to the data-output-control terminal 300. Proceeding to step S126, the authentication data in the ROM 32 is transmitted to the data-output-control terminal 300. Proceeding to step S128, a message is received as a response from the data-output-control terminal 300 and the received message is displayed on the LCD 44. Proceeding to step S130, it is determined whether or not a termination signal indicating that the printing of the data has ended has been received from the data-output-control terminal 300. When it is determined (Yes) that the termination signal has been received, successive processing is terminated. When it is not so determined (No), step S128 is repeatedly performed until receiving the termination signal.

When, by using the key panel 40 to input selection indicating that the image screen displayed on the LCD 44 is not identical, it is determined (No) in step S122 that the image screen displayed on the LCD 44 is not identical, the process proceeds to step S132, and an interruption signal that requests interruption of the printing of the data is transmitted to the data-output-control terminal 300. The successive processing ends.

In step S112, when, by using the key panel 40 to input selection representing the absence of desired printer PR among the usable printers PR displayed on the LCD 44, it is determined (No) that there is no desired printer PR for providing the output data, the process proceeds to step S134, and transmits, to the data-output-control terminal 300, a retry signal for requesting a re-search for a printer PR which is considered optimal for receiving provision of the output data. The process proceeds to step S104.

In step S100, if the process has determined (No) that there is no data-printing request from the user, the process waits in step S100 for the data-printing request to be transmitted.

Figure 5:
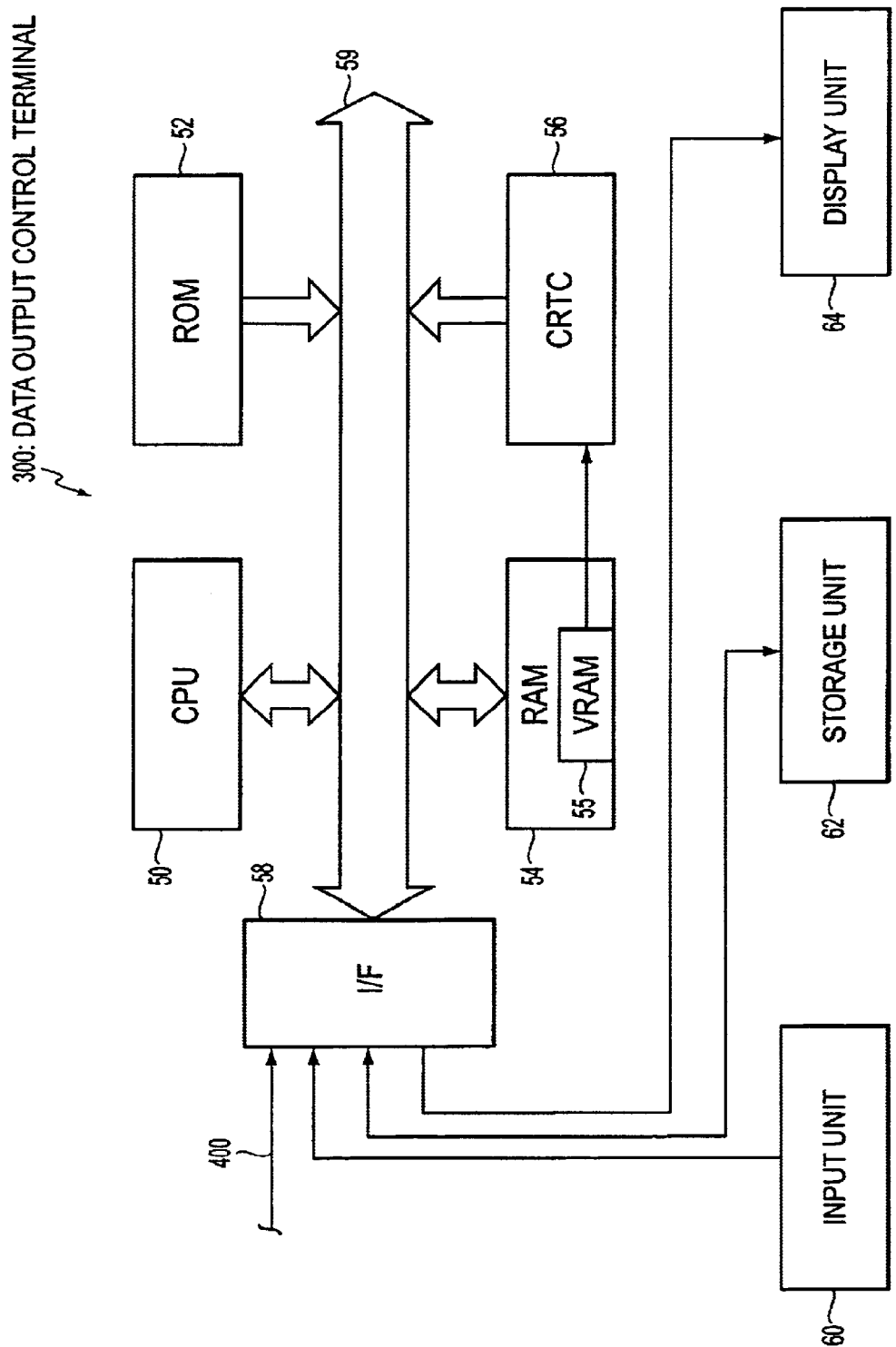
FIG. 5 is a block diagram showing the structure of a data-output-control terminal 300.

Next, with reference to FIG. 5, a structure of the data-output-control terminal 300 is described. FIG. 5 is a schematic showing the structure of the data-output-control terminal 300.

The data-output-control terminal 300 can acquire data concerning the data-printing request from the portable terminal 100, can select any one of the printers $PR_1$ to $PR_n$ to print the data, and can select the acquired data to the selected printer PR. As shown in FIG. 5, the data-output-control terminal 300 includes a CPU 50 that controls, based on the control program, arithmetic operations and the entire system, a ROM 52 containing in a predetermined area a control program for the CPU 50, etc., a RAM 54 that stores data read from the ROM 52, etc., and operation results required for the process of operation, a CRTC 56 that converts data stored in a specified area of the RAM 54 into an image signal, and an I/F 58 that mediates the input/output of data with respect an external apparatus. A bus 59 as a signal line for transferring data is used to connect these to one another and so that data can be transmitted and received.

An input unit 60, as a human interface, including a key board and a mouse from which data can be input, a storage unit 62 that stores data and tables in the form of files, and a display unit 64 that displays a screen based on the image signal, and a signal line that establishes a link to the Internet 400 are connected as external units to the I/F 58.

The RAM 54 includes a VRAM 55 as a specified area that stores display data for display on the display unit 64, and the VRAM 55 can be separately accessed by the CPU 50and the CRTC 56.

The CRTC 56 sequentially reads the display data stored in the VRAM 55 from a start address, and outputs, to the display unit 64, an image signal obtained by converting the read display data.

The storage unit 62 stores printer information on each printer PR which is required to select any one of the printers $PR_1$ to $PR_n$ to print the data. The printer information is obtained by registering, for each of the printers $PR_1$ to $PR_n$, printer-location data that specifies a place where the printer PR is installed, print-format data representing data formats (i.e., data formats that can be printed by the printer PR) that can be converted by a data-format-converting terminal CS corresponding to the printer PR, print-specification data representing printing specifications of th printer PR, and printer-identification data representing the printer ID.

Figure 6:
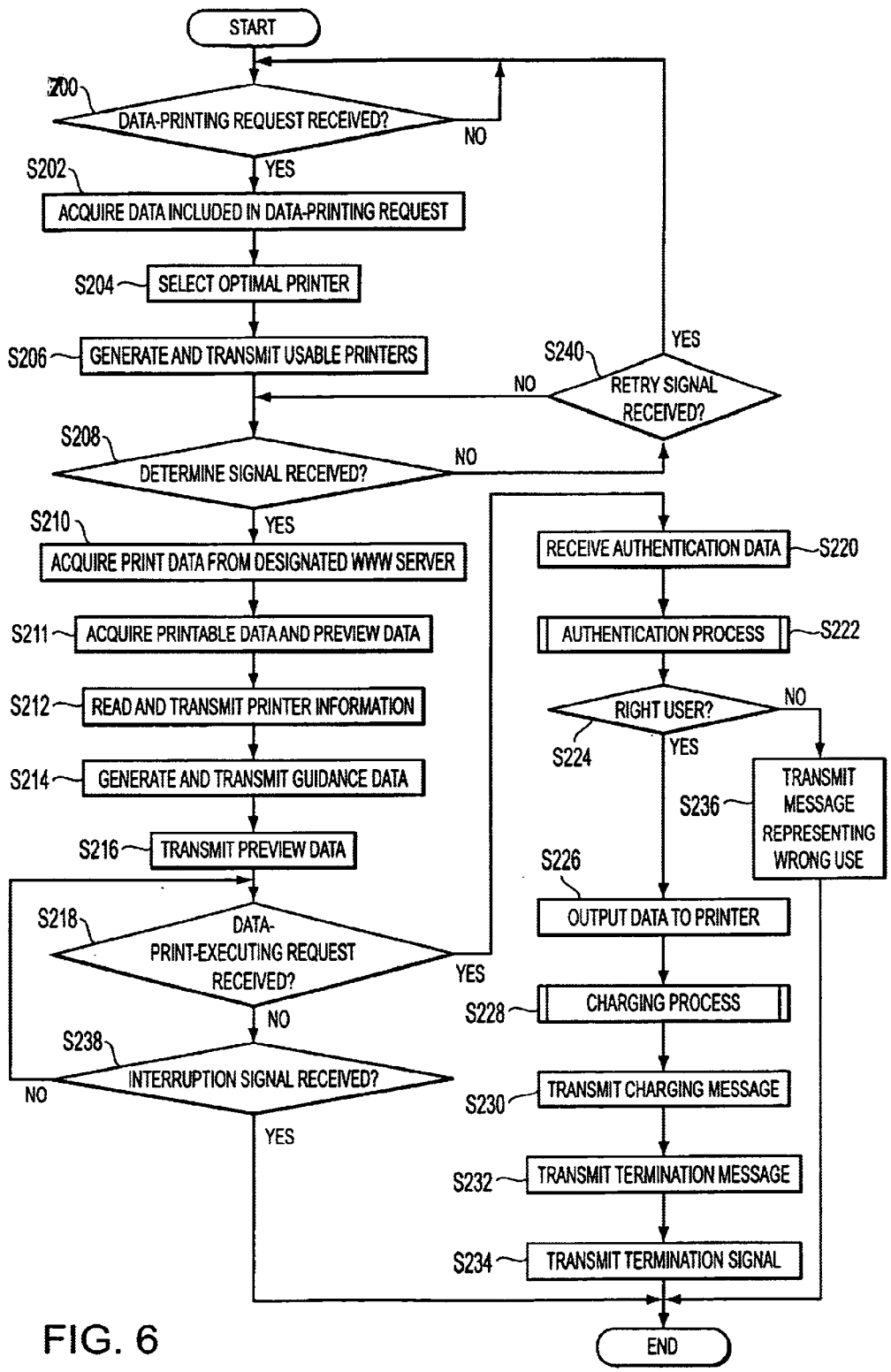
FIG. 6 is a flowchart showing a data-output control process.

The CPU 50 is formed by a micro-processing unit MPU or the like, and starts a predetermined program stored in a predetermined area of the ROM 52, thereby executing the data-output-control process shown in FIG. 6 in accordance with the program. FIG. 6 is a flowchart showing the data-output-control process.

The data-output-control process includes acquiring the print data about the data-printing request from the portable terminal 100, selecting any printer PR which is considered optimal for the user to receive provision of the output data, and outputting the acquired print data to the selected printer PR. When this process is executed by the CPU 50, first, the process proceeds to step S200, as shown in FIG. 6.

In step S200, the process determines whether or not the data-printing request has been received from the portable terminal 100. If the process has determined (Yes) that the data-printing request has been received, the process proceeds to step S202, and acquires data (including at least and print-object-storage-position data) included in the received data-printing request. Proceeding to step S204, the process selects any printer PR which is considered optimal for the user of the portable terminal 100 to receive provision of the output data.

In step 5204, specifically, based on the acquired portable-terminal-position data, the printer-location data in the storage unit 62 is retrieved, and some printers PR are selected which are considered closest in distance or time when the position of the portable terminal 100 is used as a reference. When the data-printing request includes desired-place-for-provision data, the printer-location data in the storage unit 62 is retrieved based on the desired-place-for-provision data, and all printers PR, located in a region specified by the desired-place-for-provision data, are selected. When the data-printing request includes the printing-specification data, the printing-specification data in the storage unit 62 is retrieved, and all printers PR corresponding to the printing-specification data are selected.

In addition, when the data-printing request includes the print-format data, the print-format data in the storage unit 62 is retrieved based on the acquired print-format data, all printers PR corresponding to the print-format data are selected. When the data-printing request includes the printer-identification data, the printer-identification data in the storage unit 62 is retrieved based on the acquired printer-identification data, and the printer PR which matches the printer-identification data is selected. When the data-printing request includes these types of data in combination, each type of data is used to narrow the selection range. However, when the desired-place-for-provision data is included, if a region specified by the desired-place-for-provision data does not include a position specified by the portable-terminal-position data, the narrowing of the selection range using the portable-terminal-position data is not performed, and if the printer-identification data is included, the narrowing of the selection range using other data is not performed.

Next, in step S204, usable-printer data in which the printers PR selected in step S202 are listed is generated, and the generated usable-printer data is transmitted to the portable terminal 100. The process proceeds to step S208.

In step S208, the process determines whether or not a determination signal has been received from the portable terminal 100. If the process has determined (Yes) that the determination signal has been received, the process proceeds to step S210, and acquires print data from a WWW server DS specified by a URL included in the acquired print-object-storage-position data. Proceeding to S211, the process transmits the acquired print data to a data-format-converting terminal CS which can converts the print data and which corresponds to the determined printer PR, and acquires, as a response, data printable by the determined printer PR and preview data from the data-format-converting terminal CS. The process proceeds to step S212.

In step S212, printer information about the determined printer PR is read from the storage unit 62 and the read printer information is transmitted to the portable terminal 100. Proceeding to step S214, the process generates guidance data about the determined printer PR, and transmits the generated guidance data to the portable terminal 100. Proceeding to step S216, the process transmits the preview data to the portable terminal 100, and proceeds to step S218.

In step S218, the process determines whether or not the data-print-executing request has been received from the portable terminal 100. If the process has determined (Yes) that the data-print-executing request has been received, the process proceeds to step S220, and receives the authentication data from the portable terminal 100. Proceeding to S222, the process executes an authentication process that determines, based on the received authentication data, whether or not the user of the portable terminal 100 is a right user who may use a printing service provided by the data-output-control terminal 300, and proceeds to step S224.

In step S224, as a result of the authentication process in step S222, the process determines whether or not the user of the portable terminal 100 is the right user. If the process has determined (Yes) that the user of the portable terminal 100 is the right user, the process proceeds to step S226, and transmits the data printable by the determined printer PR to the printer PR. Proceeding to step S228, the process executes a charging process in which charging is performed in accordance with the result of using, by the portable terminal 100, the printing service provided by the data-output-control terminal 300.

In step S228, specifically, a call charge (e.g., a call charge per minute) of the portable terminal 100 is calculated. Also, by referring to a charge-calculation-prescribed table that prescribes service charges, as costs for the provided printing service, concerning, for example, the capacity of the acquired print data, the number or sheets printed by the printer PR, and printing specifications of the printer PR, which are the results of using the service by the portable terminal 100, a service charge in accordance with the results of using the service by the portable terminal 100 is calculated and added to the call charge, and the total amount of addition is stored as a billing amount to the user of the portable terminal 100.

Next, proceeding to step S230, the process transmits, to the portable terminal 100, a billing message representing the service charge calculated by the charging process in step S228. Proceeding to step S232, the process transmits, to the portable terminal 100, a termination message indicating that the data printing has ended. Proceeding to step S234, the process transmits a termination signal to the portable terminal 100, and terminates this successive process.

In step S224, if the process has determined (No) that the user of the portable terminal 100 is not the right user, the process proceeds to step S236, and transmits a message representing a wrong user before terminating this successive process.

In step S218, if the process has determined (No) that the data-printing request has not been received from the portable terminal 100, the process proceeds to step S238, and determines whether or not the interruption signal has been received from the portable terminal 100. If the process has determined (Yes) that the interruption signal has been received, the successive process ends. If the process has negatively determined (No), the process proceeds to step S218.

In step S208, if the process has determined (No) that the determination has not been received from the portable terminal 100, the process proceeds to step S240, and determines whether or not the retry signal has been received. If the process has determined (Yes) that the retry signal has been received, the process proceeds to step S200. If the process has negatively determined (No), the process proceeds to step S208.

In step S200, if the process has determined (No) that the data-printing request has not been received from the portable terminal 100, the process waits in step S200 for the data-printing request to be received.

Next, the above-described embodiment is described.

At first, when the right user who uses the printing service provided by the data-output-control terminal 300 operates the portable terminal 100 carried by the user to access, for example, the WWW server $DS_1$, display data of the WWW server $DS_1$ is displayed on the LCD 44. At this time, a case in which the user will print detailed data about the data displayed on the LCD 44 is exemplified.

In order for the user to print objective data, the user input a data-printing request from the key panel 40.

When the data-printing request is input to the portable terminal 100, in steps S100 and S102, the CPU 30 determines the position of the present spot by using the position-determination apparatus 46 and displays, on the LCD 44, a request to input printing-related various types of information. Here, when the user designates and inputs the URL of the WWW server $DS_1$ at which the user is viewing the input printing-related various types of information, in steps S104 to S108, based on the input printing-related various types of information, portable-terminal-position data and print-object-storage-position data are generated as data to be included in the data-printing request, and the data-printing request is transmitted to the data-output-control terminal 300.

When the data-output-control terminal 300 receives the data-printing request, in steps S200 to S204, the CPU 50 acquires the data (the portable-terminal-position data and the print-object-storage-position data) included in the received data-printing request, retrieves, based on the acquired portable-terminal-position data, the printer-location data in the storage unit 62, and selects some printers PR which are considered closest in distance and time when the position of the portable terminal 100 is used as a reference. At this time, when the printers $PR_1$ to $PR_5$ are selected, in step S206, usable-printer data in which the printers $PR_1$ to $PR_5$ are listed is generated and the generated usable-printer data is transmitted to the portable terminal 100.

When the portable terminal 100 receives the usable-printer data, in step S110, based on the received usable-printer data, the listed printers $PR_1$ to $PR_5$ are displayed on the LCD 44. When the user input the selected printer $PR_1$ from the key panel 40, in steps 112 and 114, a determination signal representing the determined printer $PR_1$ is transmitted to the data-output-control terminal 300.

When the data-output-control terminal 300 receives the determination signal, in steps S208 to S211, from the WWW server $DS_1$ specified by the URL included in the acquired print-object-storage-position data, print data is acquired, the acquired print data is transmitted to a data-format-converting terminal CS (e.g., the data-format-converting terminal $CS_1$) which can converts the print data and which corresponds to the determined printer $PR_1$, and data printable by the determined printer $PR_1$ and preview data are acquired as a response from the data-format-converting terminal $CS_1$. In steps S212 to S216, printer information about the determined printer $PR_1$ is read from the storage unit 62, the read printer information is transmitted to the portable terminal 100, guidance data on the determined printer Preferably is generated, the generated guidance data is transmitted to the portable terminal 100, and the preview data is transmitted to the portable terminal 100.

When the portable terminal 100 receives the printer information, the guidance data, and the preview data, in steps S116 to S120, based on the received printer information, detailed information on the printer PR is displayed on the LCD 44, based on the guidance data, information on guidance from the position of the portable terminal 100 to the installation place where the printer $PR_1$ is installed is displayed on the LCD 44, and based on the received preview data, an image screen obtained when it is printed by the determined printer $PR_1$ is displayed on the LCD 44. Here, when the user inputs, from the key panel 40, a selection indicating that the image screen displayed on the LCD 44 is identical to the print data to be printed, in steps S122 to S126, a data-print-executing request and authentication data in the ROM 32 are transmitted to the data-output-control terminal 300.

When the data-output-control terminal 300 receives the data-print-executing request and the authentication data, in steps S218 to S222, the authentication process based on the received authentication data is executed. Since the user is a right user who may use the printing service provided by the data-output-control terminal 300, in steps S224 to S234, data printable by the determined printer $PR_1$ is transmitted to the printer $PR_1$, and a billing message, a termination message, and a termination signal are transmitted to the portable terminal 100.

When the portable terminal 100 receives the billing message, the termination message, and the termination signal, steps S128 and S130 are repeatedly performed, whereby the billing message and the termination message are displayed on the LCD 44. When receiving the data printable by the printer $PR_1$, the printer $PR_1$ performs printing based on the received data.

After the termination message is displayed, while viewing the guidance information, the user visits the store $S_1$ in which the printer $PR_1$ is installed, and receives data printed by the printer $PR_1$. A service charge as a cost for the provided printing service is added to the call charge of the portable terminal 100 and is billed.

Conversely, the service provider can obtain a cost for provision of service by charging the user for the sum of the service charge as a cost for provision of the printing service and the call charge.

When the user inputs, as the printing-related various types of information, a desired area as an approximate place in which the user wishes for the output data to be provided, desired-area-for-provision data representing the desired area is transmitted to the data-output-control terminal 300, and the data-output-control terminal 300 retrieves, based on the obtained desired-area-for-provision data, printer-position data in the storage unit 62, so that all printers PR located in an area specified by the desired-area-for-provision data are selected.

When the user inputs, as the printing-related various types of information, printing specifications of the printer PR, printing-specification data representing the printing specifications is transmitted to the data-output-control terminal 300, and the data-output-control terminal 300 retrieves, based on the obtained printing-specification data, printing-specification data in the storage unit 62, so that all printers PR corresponding to the printing-specification data are selected.

When the user inputs, as the printing-related various types of information, a data format, print-format data representing the data format is transmitted to the data-output-control terminal 300, and the data-output-control terminal 300 retrieves, based on the obtained print-format data, print-format data in the storage unit 62, so that all printers PR corresponding to the printing-specification data are selected.

When the user inputs, as the printing-related various types of information, the printer ID of a printer PR in order to directly designate the printer PR, printer-identification data representing the printer ID is transmitted to the data-output-control terminal 300, the data-output-control terminal 300 retrieves, based on the obtained printer-identification data, printer-identification data in the storage unit 62, so that the printer PR corresponding to the printer-identification data is selected.

When the user is not a right user who may use the printing service provided by the data-output-control terminal 300, even if at the time the image screen is displayed on the LCD 44, the key panel 40 is used to input a selection indicating that the image screen displayed on the LCD 44 is identical to print data to be printed, the objective data is not printed by the printer $PR_1$.

As described above, in this embodiment, the data-output-control terminal 300 acquires data according to a data-printing request from the WWW server DS, selects any one of a plurality of printers PR, and outputs the acquired data to the selected printer PR.

This makes it possible to easily obtain detailed information on the Internet 400, compared with a conventional case, and makes it possible to use the data-output-control terminal 300 to process the print data and the data printable by the printer PR when the detailed information is printed. Thus, the need for increasing the capacity of memory is eliminated, and processing load on the portable terminal 100 is reduced. Also, since the portable terminal 100 does not need to read data, a communication time is reduced, so that the time required to receive provision of the output data is reduced. Therefore, the service provider can provide an information service to the user from which a feeling of great satisfaction is obtained and can provide a printing service in which a comfortable printing environment is established irrespective of the function of the portable terminal 100.

In addition, in this embodiment, based on portable-terminal-position data for specifying the position of the portable terminal 100, any one is selected from among a plurality of printers PR.

This allows a printer PR related to the position of the portable terminal 100 to print data. Accordingly, by selecting a printer PR which is closest in distance and time when, for example, the position of the portable terminal 100 is used as a reference, the user is allowed to easily receive provision of the output data, so that the detailed information on the Internet 400 can be much easily obtained. Therefore, the service provider can provide the user with an information service from which a feeling of higher satisfaction is obtained.

In this embodiment, the data-output-control terminal 300 selects, from among a plurality of printers PR, a printer PR which is considered optimal for the user of the portable terminal 100 to receive provision of the output data.

This allows the user to easily receive provision of the output data, so that the user can easily obtain the detailed information on the Internet 400. Accordingly, the service provider can provide the user with an information service from which a feeling of higher satisfaction is obtained.

In addition, in this embodiment, the data-output-control terminal 300 acquires data from a WWW server DS specified by a URL included in the data-printing request.

This makes it possible to obtain detailed information located in all WWW servers which are connected to the Internet 400. Accordingly, the service provider can provide the user with an information service from which a feeling of higher satisfaction is obtained.

In this embodiment, the data-output-control terminal 300 acquires, as data according to the data-printing request, print data from the WWW server DS.

This allows the portable terminal 100 to display outline information and allows the printer PR to print detailed information, so that the portable terminal 100 can obtain detailed information on the Internet 400, and moreover, comfortable displaying processing is realized. Accordingly, the service provider can provide an information service to the user from which a feeling of higher satisfaction is obtained and can provide a printing service in which much comfortable printing environment is established.

In this embodiment, the data-output-control terminal 300 transmits, to the portable terminal 100, preview data generated by the data-format-converting terminal CS, and outputs data according to a data-printing request to the printer PR when receiving, as a response to the output preview data, a data-print-executing request from the portable terminal 100.

Thereby, by notifying the user of preview data before providing the output data, the user can be prevented from printing data by mistake. Accordingly, the service provider can provide the user with an information service from which a feeling of higher satisfaction is obtained.

In this embodiment, the data-output-control terminal 300 performs billing in accordance with the result of using, by the portable terminal 100, the printing service provided by the data-output-control terminal 300.

This makes it possible to clearly calculate a service charge as a cost for provision of printing service, and eliminates the need for calculating the service charge whenever the printing service is provided. Accordingly, the service provider has a facilitated business procedure for settlement of the service charge, and clearly shows the service charge to the user, thereby providing an information service from which a feeling of great satisfaction is obtained.

In this embodiment, the service charge as a cost for provision of the printing service is added to the call charge.

This enables the user to easily pay the service charge, and enables the service provider to easily and securely collect the service charge and to have a facilitated business procedure for settlement of the service charge.

In this embodiment, the data-output-control terminal 300 outputs, to the printer PR, data converted by the data-format-converting terminal CS.

Accordingly, if a new printer PR is provided, the service provider side simply needs to change settings of the data-format-converting terminal CS only for the new printer PR. The user side can use the new printer PR without particularly changing the settings. Therefore, the service provider has a facilitated setting operation for additional provision of the printer PR, and can provide the user with an information service from which a feeling of higher satisfaction is obtained.

In this embodiment, the data-output-control terminal 300 transmits, to the portable terminal 100, guidance information representing guidance information that guides the user from the position of the portable terminal 100 to an installation place where the determined printer PR is installed.

This enables the user to go to the installation place where the printer PR is installed, in accordance with the guidance information, so that the printer PR can relatively securely obtain the output data. Accordingly, the service provider can provide the user with an information service from which a feeling of higher satisfaction is obtained.

In this embodiment, concerning the data-format-converting terminals $CS_1$ to $CS_1$, in accordance with a transmission load on the Internet 400 or a processing load on the data-format-converting terminal CS, any one or more are selected from among the data-format-converting terminals $CS_1$ to $CS_1$, and each selected data-format-converting terminal CS is used to execute the data-format-converting process.

This enables the data-format-converting process to be executed by the data-format-converting terminal CS having a small transmission load on the Internet 400 or a small processing load on the data-format-converting terminal CS. Thus, irrespective of the transmission load on the Internet 400 or the processing load on the data-format-converting terminal CS, the time required for receiving provision of the output data is approximately constant. Accordingly, the service provider can provide the user with a printing service in which a much printing environment is established.

In the above-described embodiment, the portable terminal 100 corresponds to a communication terminal, the WWW servers $DS_1$ to $DS_m$ each correspond to a data-storage terminal, and the printers $PR_1$ to $PR_n$ each correspond to an output terminal.

In the above-described embodiment, step S108 corresponds to a transmitting step, step S210 corresponds to an acquiring device, or to an acquiring step, and step S204 corresponds to a selecting device, or to a selecting step.

In the above-described embodiment, step S226 corresponds to an output device, or to an output step, step S216 corresponds to an output device, steps S212 and S214 correspond to an output device, the data-format-converting terminals $CS_1$ to $CS_1$ and step S228 corresponds to a charging device, and correspond to an image-data generating device or a data converting device.

In the above-described embodiment, the printers $PR_1$ to $PR_n$ that print data are provided and any printer PR is used to print data according to a data-printing request from the portable terminal 100. Otherwise, for example, by providing output units that display data or output data as sound or the like, the data according to the data-printing request from the portable terminal 100 may be output by any one of the output units.

In the above-described embodiment, the data-format-converting terminal CS is used to generate preview data.

Otherwise, the data-output-control terminal 300 may be used to generate the preview data.

In the above-described embodiment, concerning the data-format-converting terminals $CS_1$ to $CS_1$, in accordance with a transmission load on the Internet 400 or a processing load on the data-format-converting terminal CS, any one or more are selected from among the data-format-converting terminals $CS_1$ to $CS_1$, and each selected data-format-converting terminal CS is used to execute the data-format-converting process. Otherwise, a specified data-format-converting terminal may be used to execute the data-format-converting process.

In the above-described embodiment, a specified data-output-control terminal 300 is used to execute the processes shown in the flowcharts of FIG. 4 and FIG. 6. Otherwise, as is shown concerning the data-format-converting terminals $CS_1$ to $CS_1$, by providing a plurality of data-output-control terminals, and selecting any one of the plurality of data-output-control terminals in accordance with a transmission load on the Internet 400 or a processing load on the data-format-converting terminal, the selected data-output-control terminal may be used to perform the execution.

In this structure, a data-output-control terminal having a small transmission load on the Internet 400 or a small processing load is used to execute the processes shown in the flowcharts of FIG. 4 and FIG. 6. Thus, irrespective of the transmission load on the Internet 400 or the processing load on the data-format-converting terminal, the time required for receiving provision of the output data is approximately constant. Accordingly, the service provider can provide the user with a printing service in which a much enhanced printing environment is established.

Although the above-described embodiment describes a case in which a data-output-control apparatus according to the present invention is applied to the Internet 400, the present invention is not limited thereto, and can be applied to networks other than the Internet 400.

In the above-described embodiment, the portable terminal 100, the data-format-converting terminals $CS_1$ to $CS_1$, the WWW servers $DS_1$ to $DS_m$, the printers $PR_1$ to $PR_n$, and the data-output-control terminal 300 are linked by a single network 2. Otherwise, the data-output-control terminal 300 and the portable terminal 100, the data-output-control terminal 300 and the data-format-converting terminals $CS_1$ to $CS_1$, the data-output-control terminal 300 and the WWW servers $DS_1$ to $DS_m$, and the data-output-control terminal 300 and the printers $PR_1$ to $PR_n$ may be linked by different networks, respectively.

In the above-described embodiment, concerning the execution of the processes shown in the flowcharts of FIG. 4 and FIG. 6, cases in which the control programs stored beforehand in the ROMs 32 and 52 are executed have been described. Otherwise, from a storage medium containing programs describing these procedures, the programs may be executed after being loaded in the RAMs 34 and 54.

Here, the storage medium includes a semiconductor storage medium, such as a RAM or a ROM, a magnetic-storage storage medium, such as an FD or an HD, an optical-reading storage medium, such as a CD, a CDV, an LD, or a DVD, and a magnetic-storage/optical-reading storage medium, such as an MO, and includes any type of storage medium if it is a computer-readable storage medium irrespective of electronic, magnetic, and optical reading methods, etc.

In the above-described embodiment, as shown in FIG. 2, a data-output-control apparatus according to the present invention is applied to the case of providing a service in which in accordance with a data-printing request from the user, data according to the data-printing request is acquired from any one of the WWW servers $DS_1$ to $DS_m$ and is output to any one of the printers $PR_1$ to $PR_n$ by the service provider using the data-output-control terminal 300. However, the present invention is not limited to the case, but may be applied to other cases without departing from the spirit of the present invention.

What is claimed is:

1. A data-output-control apparatus that links, so as to communicate with, a communication terminal, which transmits a data-output request, and an output terminal, which outputs data, said data-output-control apparatus comprising:

a device that receives a data-output request from said communication terminal and outputs data according to the data-output request to said output terminal, the device further links, so as to communicate with, a data-storage terminal that stores data, the data according to the data-output request being acquired from said data-storage terminal and the acquired data being output to said output terminal, the device outputting, to the communication terminal, guidance data representing guidance information to guide a user of the communication terminal to an installation place where the output terminal is installed.

2. The data-output-control apparatus according to claim 1, wherein said guidance data includes routing information.

3. A data-output-control apparatus that links, so as to communicate with, a communication terminal, which transmits a data-output request, and a plurality of output terminals, which output data, said data-output-control apparatus comprising:

a device that receives the data-output request from said communication terminal and outputs data according to the data-output request to one of the plurality of output terminals, the one of the plurality of output terminals being selected, and the data according to the data-output request being output to the selected output terminal, wherein the device outputs, to the communication terminal, guidance data representing guidance information to guide a user of the communication terminal to an installation place where the selected output terminal is installed.

4. The data-output-control apparatus according to claim 2, wherein said guidance data includes routing information.

5. A data-output-control apparatus that links, by a network, so as to communicate with, a portable terminal carried by a user, which transmits a data-printing request, and a plurality of output terminals located in areas which print data, said data-output-control apparatus comprising:

a device that receives the data-output request from said portable terminal and outputs the data according to the data-printing request to one of the output terminals, the device further links, so as to communicate with, each data-storage terminal that stores data by the network; the device including:

an acquiring device that acquires, from said data-storage terminal, the data according to the data-printing request as a request to print the data stored in said data-storage terminal;

a selecting device that selects one of said plurality of output terminals, wherein the selected output terminal is considered optimal for the user of said portable terminal to receive the output data; and an output device that outputs the data acquired by said acquiring device to the selected output terminal.

6. The data-output-control apparatus according to claim 5, the data-printing request including an address uniquely specifying the position on said network of said data-storage terminal; and said acquiring device acquires data from one data-storage terminal specified by the address included in the data-printing request.

7. The data-output-control apparatus according to claim 5, the data-storage terminal stores display data to display by said portable terminal and print data to print by said output terminal corresponding to the display data; and said acquiring device acquires, as the data according to the data-printing request, the print data from said data-storage terminal.

8. The data-output-control apparatus according to claim 5, further comprising an image-data generating device that generates, based on the data acquired by said acquiring device, image-screen data displayable by said portable terminal, the image-screen data corresponding to an image screen obtained when the data is printed by the output terminal, said output device outputs, to said portable terminal, the image-screen data generated by said image-data generating device, and outputs the data acquired by said acquiring device to the output terminal selected by said selecting device when receiving, as a response to the output of the image-screen data, a data-print-executing request from said portable terminal.

9. The data-output-control apparatus according to claim 5, further comprising a charging device that performs charging in accordance with a result of use by said portable terminal of a printing service provided by said apparatus.

10. The data-output-control apparatus according to claim 5, further comprising a data-converting device that converts the data acquired by said acquiring device into data printable by said output terminal, said output device outputs the data obtained through the conversion by said data-converting device to the output terminal selected by said selecting device.

11. The data-output-control apparatus according to claim 5, said output device outputs, to said portable terminal, guidance data representing guidance information to guide the user of said portable terminal to an installation place where the output terminal selected by said selecting device is installed.

12. A data-output-service providing method for providing a service in which, by using a network system using a network to communicate with a plurality of output terminals located in areas which print data, and a data-storage terminal that stores data, a service provider outputs, in response to a data-printing request from a user, data according to the data-printing request to the output terminals, the method comprising:

transmitting, for the user, the data-printing request as a request to print the data stored in said data-storage terminal;

acquiring, for the service provider, from said data-storage terminal, the data according to the data-printing request from said user;

selecting one of said plurality of output terminals, wherein the selecting step includes selecting, from among said plurality of output terminals, an output terminal which is considered optimal for the user of said output terminal to receive the output data; and outputting the data acquired in said acquiring step to the selected output terminal.

13. The data-output service providing method as in claim 12, further comprising a step of providing guidance data representing guidance information for guiding the user of said portable terminal to an installation place where the selected output terminal is installed.

14. The data-output-service providing method as in claim 13, wherein the step of providing guidance data includes routing information.

15. A data-output-control apparatus that links, by a network, so as to communicate with, a portable terminal carried by a user, which transmits a data-printing request, and a plurality of output terminals located in areas which print data, said data-output-control apparatus comprising:

a device that receives the data-output request from said portable terminal and outputs the data according to the data-printing request to one of the output terminals, the device further links, so as to communicate with, each data-storage terminal that stores data by the network; the device including:

an acquiring device that acquires, from said data-storage terminal, the data according to the data-printing request as a request to print the data stored in said data-storage terminal;

a selecting device that selects one of said plurality of output terminals; and an output device that outputs the data acquired by said acquiring device to the selected output terminal, wherein the device outputs, to the output terminal, guidance data representing guidance information to guide a user of the portable terminal to an installation place where the selected output terminal is installed.

16. The data-output-service providing method as in claim 15, wherein the step of providing guidance data includes routing information.

17. A data-output-service providing method for providing a service in which, by using a network system using a network to communicate with a plurality of output terminals located in areas which print data, and a data-storage terminal that stores data, a service provider outputs, in response to a data-printing request from a user, data according to the data-printing request to the output terminals, the method comprising:

transmitting, for the user, the data-printing request as a request to print the data stored in said data-storage terminal;

acquiring, for the service provider, from said data-storage terminal, the data according to the data-printing request from said user;

selecting one of said plurality of output terminals;

outputting the data acquired in said acquiring step to the selected output terminal; and transmitting guidance data representing guidance information to guide a user to an installation place where the selected output terminal is installed.

18. The data-output-service providing method as in claim 17, wherein the step of providing guidance data includes routing information.

* * * * *